H. H. STEVENS.
Draft-Equalizers.

No. 153,989

Patented Aug. 11, 1874.

UNITED STATES PATENT OFFICE.

HENRY H. STEVENS, OF RILEY, ILLINOIS.

IMPROVEMENT IN DRAFT-EQUALIZERS.

Specification forming part of Letters Patent No. 153,989, dated August 11, 1874; application filed June 6, 1874.

*To all whom it may concern:*

Figure 1:
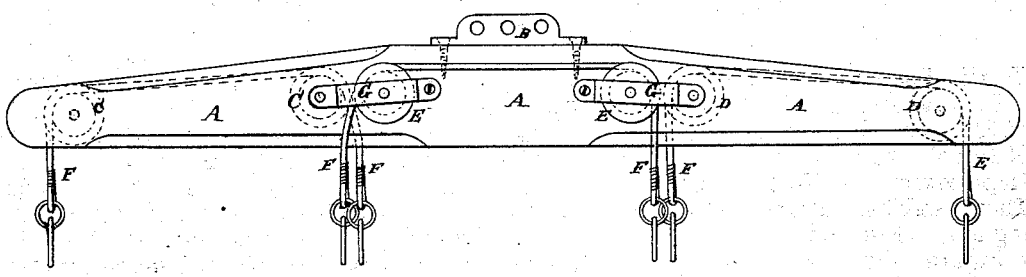
Figure 2:
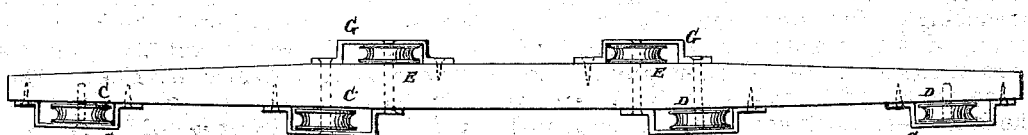

Be it known that I, HENRY H. STEVENS, of Riley, in the county of McHenry and State of Illinois, have invented a new and useful Improvement in Draft-Equalizer for Two, Three, and Four Horses, of which the following is a specification:

Figure 1 is a top view of my improved equalizer, shown as arranged for three horses. Fig. 2 is a front view of the same.

Similar letters of reference indicate corresponding parts.

My invention has for its especial object to equalize the draft of three horses working abreast, so that there will be no unequal wrenching or side draft upon the shoulders of any of the animals should one start forward suddenly or, by reason of greater force or mettle, remain permanently in advance of the other two, but which may be applied with equal advantage for equalizing the draft when two or four horses are used. The invention consists in the combination and arrangement of parts, as hereinafter described and claimed.

A represents the draft bar or lever, to the rear side of the middle part of which is securely bolted an iron bar, B, in which are formed a number of holes to receive the draft, one of which should be in the center line of the lever A, and the others at different distances upon each side of said center line, so that by changing the point of draft attachment an advantage of leverage may be given to one of the three horses or one pair of the four horses. To the under side of the end parts of the lever A are pivoted two pairs of pulleys, C D, and to the upper side of the middle part of said lever is pivoted a third pair of pulleys, E, upon the opposite sides of and equally distant from the center of the lever. F are three draw ropes or tugs, one of which is passed around each pair of pulleys, and to their ends are attached the traces. To the right-hand ends of the right-hand and center tugs are attached the traces of the first horse. The traces of the second horse are attached to the left-hand ends of the said right-hand and center tugs. The traces of the third horse are attached to the ends of the left-hand tug; or the hitch may be reversed by commencing with the left-hand horse.

By this construction by changing the point of draft attachment the third horse may be made to draw more or less than one-third of the load, while the two other horses will draw equally. To adjust the equalizer for two horses the center tug and the inner pulleys of the side pairs C D are removed, and each end tug is passed around one end pulley and the adjacent center pulley. This brings the two horses nearer together. To adjust the equalizer for four horses, four pairs of pulleys are used, the first or right-hand pair being placed below the lever, the second pair above the lever, the third below, and the fourth above, and the adjacent ends of each two pair may be crossed, as hereinbefore described. The tugs F are kept in place upon the pulleys, and the said pulleys are strengthened by caps G. The caps G for the pulleys above the lever may be plain, but those below the lever should be widened upon the rear side and next the ends of the tugs, and should be slightly curved, so that they may not obstruct said tugs. For three horses, the lever A should be beveled or tapered at each end upon one of its faces to give a central draft upon the end pulley, and for four horses the lever is beveled or tapered upon its opposite faces and at each end for the same purpose. The pulleys may be placed in the front or rear of the evener-bar, or be inserted in it without departing from my invention. The graduated draw-iron, also, may be placed in front of the evener-bar, or the graduated draft may be obtained by holes bored through the evener-bar.

Having thus described my invention, I claim as new and desire to secure by Letters Patent—

1. The combination, with lever A, of pulleys C D E and tugs F F, substantially as shown and described.

2. The combination of the pulleys C D E, caps G, and tugs F, above and below the lever A, and the graduated draw-iron B, substantially as shown and described.

HENRY H. STEVENS.

Witnesses:
WILLIAM ROBINSON,
WILLIAM SEWELL.